United States Patent
Rasti

(10) Patent No.: US 10,635,228 B2
(45) Date of Patent: Apr. 28, 2020

(54) SYSTEM AND METHOD FOR MUTUAL CAPACITANCE SENSING

(71) Applicant: Samsung Display Co., Ltd., Yongin-si, Gyeonggi-do (KR)

(72) Inventor: Nancy Rasti, San Jose, CA (US)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/024,588

(22) Filed: Jun. 29, 2018

(65) Prior Publication Data

US 2019/0258351 A1 Aug. 22, 2019

Related U.S. Application Data

(60) Provisional application No. 62/634,131, filed on Feb. 22, 2018.

(51) Int. Cl.
*G06F 3/041* (2006.01)
*G06F 3/044* (2006.01)
*G06F 3/047* (2006.01)

(52) U.S. Cl.
CPC ............ *G06F 3/0416* (2013.01); *G06F 3/044* (2013.01); *G06F 3/04166* (2019.05); *G06F 3/047* (2013.01); *G06F 3/0412* (2013.01); *G06F 3/0446* (2019.05); *G06F 3/04182* (2019.05); *G06F 2203/04111* (2013.01)

(58) Field of Classification Search
CPC ...... G06F 3/0416; G06F 3/0412; G06F 3/041; G06F 2203/04111; G06F 3/044; G06F 3/047; H03K 17/955; H03K 17/96; G06G 7/186; H01L 23/642; H02M 3/07
See application file for complete search history.

(56) References Cited

U.S. PATENT DOCUMENTS

| | | | | |
|---|---|---|---|---|
| 5,532,527 | A | * | 7/1996 | Zatler ............... G01F 23/242 307/118 |
| 5,757,196 | A | * | 5/1998 | Wetzel ............... H03K 17/955 307/116 |
| 8,749,501 | B2 | | 6/2014 | Oda et al. |
| 9,612,691 | B2 | | 4/2017 | Chen |
| 2009/0224775 | A1 | * | 9/2009 | Nishizono ........... H03K 17/962 324/658 |
| 2011/0100728 | A1 | * | 5/2011 | Chen ................... G06F 3/044 178/18.06 |

(Continued)

OTHER PUBLICATIONS

Sedra, Adel S. et al., Microelectronic Circuits, Second Edition, Published 1987, pp. 57, 97-99 (Year: 1987).*

*Primary Examiner* — Michael J Eurice
(74) *Attorney, Agent, or Firm* — Lewis Roca Rothgerber Christie LLP

(57) ABSTRACT

A display device includes: a display panel configured to display an image at an active area; a touch screen panel overlapping the display panel at the active area, the touch screen panel comprising an input line and an output line; and an operational amplifier having an input electrode coupled to the input line and an output electrode coupled to the output line, wherein the display device is configured to measure a voltage at the output electrode of the operational amplifier for detecting a touch event at an intersection between the input line and the output line.

14 Claims, 6 Drawing Sheets

(56) References Cited

U.S. PATENT DOCUMENTS

| | | | |
|---|---|---|---|
| 2011/0234508 A1* | 9/2011 | Oda | G06F 3/044 345/173 |
| 2011/0261006 A1* | 10/2011 | Joharapurkar | G06F 3/0416 345/174 |
| 2011/0310054 A1* | 12/2011 | Souchkov | G06F 3/0416 345/174 |
| 2012/0050206 A1* | 3/2012 | Welland | G06F 3/0416 345/174 |
| 2012/0313890 A1* | 12/2012 | Mohindra | G06F 3/0416 345/174 |
| 2013/0285952 A1* | 10/2013 | Huang | G09G 3/3611 345/173 |
| 2013/0285971 A1* | 10/2013 | Elias | G06F 3/044 345/174 |
| 2014/0035601 A1* | 2/2014 | Fujiyoshi | G01R 35/00 324/684 |
| 2014/0247243 A1* | 9/2014 | Heo | G06F 3/044 345/174 |
| 2014/0292708 A1* | 10/2014 | Kwon, II | G06F 3/044 345/174 |
| 2014/0327644 A1* | 11/2014 | Mohindra | G06F 3/044 345/174 |
| 2015/0002176 A1* | 1/2015 | Kwon, II | G06F 3/0416 324/679 |
| 2015/0205405 A1* | 7/2015 | Yumoto | G06F 3/044 345/174 |
| 2015/0254491 A1* | 9/2015 | Mo | G06F 3/0416 345/174 |
| 2015/0309655 A1* | 10/2015 | Park | G06F 3/0416 345/173 |
| 2015/0355777 A1* | 12/2015 | Kwon, II | G06F 3/0416 345/174 |
| 2016/0091999 A1* | 3/2016 | Dattalo | H03K 17/9622 345/174 |
| 2016/0098141 A1* | 4/2016 | Kang | G06F 3/0416 345/174 |
| 2016/0098150 A1* | 4/2016 | Kang | G06F 1/163 345/174 |
| 2016/0124544 A1* | 5/2016 | Kang | G06F 3/044 345/174 |
| 2016/0170519 A1* | 6/2016 | Dattalo | G01D 5/24 345/174 |
| 2016/0179249 A1* | 6/2016 | Ballan | G06F 3/0416 345/174 |
| 2016/0188116 A1* | 6/2016 | Kim | G06F 3/0418 345/174 |
| 2016/0232394 A1* | 8/2016 | Riedijk | G06F 3/044 |
| 2016/0241139 A1* | 8/2016 | Yao | G06F 1/3262 |
| 2016/0349872 A1* | 12/2016 | Hargreaves | G06F 3/044 |
| 2016/0357338 A1* | 12/2016 | Roziere | G06F 3/044 |
| 2016/0370943 A1* | 12/2016 | Kim | G06F 3/044 |
| 2016/0378252 A1* | 12/2016 | Jeong | G06F 3/044 345/174 |
| 2017/0031517 A1* | 2/2017 | Zhao | G06F 3/041 |
| 2017/0038866 A1* | 2/2017 | Akhavan Fomani | G06F 3/044 |
| 2017/0075495 A1* | 3/2017 | Roberson | G06F 3/0418 |
| 2018/0052011 A1* | 2/2018 | Oshima | H03K 17/975 |
| 2018/0059856 A1* | 3/2018 | Kim | G06F 3/0416 |
| 2018/0136778 A1* | 5/2018 | Choi | G06F 3/0412 |
| 2018/0314379 A1* | 11/2018 | Shen | G06F 3/0416 |
| 2018/0321792 A1* | 11/2018 | Wu | G06F 3/0418 |
| 2019/0138782 A1* | 5/2019 | Zhang | G06F 3/04166 |

* cited by examiner

1

SYSTEM AND METHOD FOR MUTUAL CAPACITANCE SENSING

CROSS-REFERENCE TO RELATED APPLICATION

The present application claims the benefit of U.S. Provisional Patent Application No. 62/634,131, filed on Feb. 22, 2018, entitled "SYSTEM AND METHOD FOR MUTUAL CAPACITANCE SYSTEM," the entire content of which is incorporated herein by reference.

BACKGROUND

1. Field

One or more aspects of example embodiments of the present disclosure relate to a touchscreen panel, and a method of driving the same.

2. Description of the Related Art

A touch screen panel is an input device capable of inputting a user's instruction by selecting an instruction content that is displayed on a display device, or the like, with a human hand or an object. To this end, the touch screen panel may be provided on a front surface of the display device to convert information of a touch point (e.g., a contact position) of the human hand or the object into an electrical signal. The instruction content selected at the touch point may then be recognized as an input signal. Because the touch screen panel may be substituted for a separate input device connected to the display device, such as a keyboard or a mouse, its areas of application have been gradually extended.

Implementation types of touch sensors of the touch screen panel include resistive overlay touch sensors, photosensitive touch sensors, capacitive touch sensors, and the like. Among these touch sensors, the capacitive touch sensor converts the touch point information into an electrical signal by sensing a change in capacitance formed between a conductive sensing electrode and an adjacent (or overlapping) sensing electrode or ground electrode when a user's hand or object comes in contact with the touch screen panel.

The above information disclosed in this Background section is for enhancement of understanding of the background of the disclosure, and therefore, it may contain information that does not constitute prior art.

SUMMARY

Aspects of one or more example embodiments of the present disclosure include a system and method for mutual capacitance sensing.

According to some example embodiments of the present disclosure, a display device includes: a display panel configured to display an image at an active area; a touch screen panel overlapping the display panel at the active area, the touch screen panel comprising an input line and an output line; and an operational amplifier having an input electrode coupled to the input line and an output electrode coupled to the output line, wherein the display device is configured to measure a voltage at the output electrode of the operational amplifier for detecting a touch event at an intersection between the input line and the output line.

According to some embodiments, the touch event is detected based on a change in a mutual capacitance between the input line and the output line.

According to some embodiments, the display device further includes a current source coupled to the input line and the input electrode of the operational amplifier.

According to some embodiments, the current source is configured to apply a predetermined charge to the input line and the input electrode of the operational amplifier.

According to some embodiments, the voltage at the output electrode of the operational amplifier is proportional to a ratio of a predetermined input charge divided by a mutual capacitance between the input line and the output line.

According to some embodiments, the display device is configured to detect the touch event in response to a change in the voltage at the output electrode of the operational amplifier.

According to some embodiments, a mutual capacitance between the input line and the output line is directly amplified using miller amplification.

According to some example embodiments, a system includes: a touch screen panel comprising an input line and an output line; an operational amplifier having an input electrode coupled to the input line and an output electrode coupled to the output line; and a current source coupled to the input line and the input electrode of the operational amplifier for applying a predetermined charge to the input line and the input electrode of the operational amplifier, wherein the touch screen panel is configured to measure a voltage at the output electrode of the operational amplifier for detected a touch event at an intersection between the input line and the output line.

According to some embodiments, the system further includes a display panel configured to display an image at an active area.

According to some embodiments, the touch screen panel overlaps the display panel at the active area.

According to some embodiments, the touch event is detected based on a change in mutual capacitance between the input line and the output line.

According to some embodiments, the voltage at the output electrode of the operational amplifier is proportional to a ratio of a predetermined input charge divided by a mutual capacitance between the input line and the output line.

According to some embodiments, the system is configured to detect the touch event in response to a change in the voltage at the output electrode of the operational amplifier.

According to some embodiments, a mutual capacitance between the input line and the output line is directly amplified using miller amplification.

According to some example embodiments, in a method of driving a touch screen panel, the method includes: applying an input charge to an input line and an input electrode of an operational amplifier; measuring an output voltage from an output electrode of the operational amplifier; and detecting a touch event based on a change in the output voltage from the output electrode of the operational amplifier, wherein the input line is connected to the input electrode of the operational amplifier and an output line is connected to the output electrode of the operational amplifier.

According to some embodiments, the change in the output voltage is based on a change in a mutual capacitance between the input line and an output line.

According to some embodiments, the method further includes applying the input charge by a current source coupled to the input line and the input electrode of the operational amplifier.

According to some embodiments, a mutual capacitance between the input line and an output line is directly amplified using miller amplification.

According to some embodiments, the touch screen panel comprises the input line and the output line, overlaps a display panel at an active area configured to display an image.

According to some embodiments, the voltage at the output electrode of the operational amplifier is proportional to a ratio of the input charge divided by a mutual capacitance between the input line and an output line.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
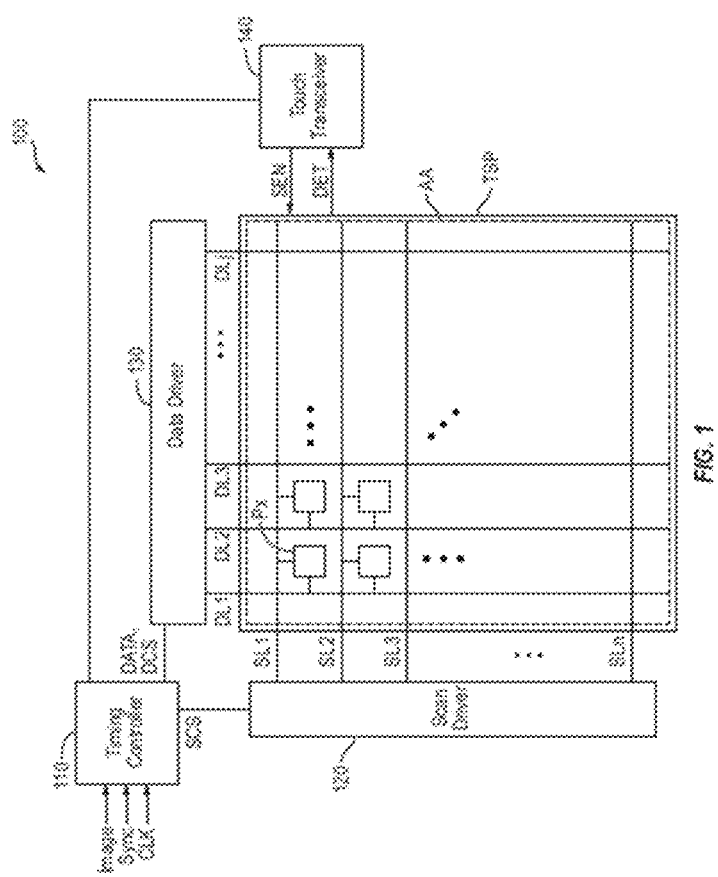
FIG. 1 is a diagram illustrating a display device including a touch screen panel according to one or more embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be more thorough and more complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Generally, for capacitive touch screen panels, a known (e.g., set or predetermined) signal is input to a touch sensor of the touch screen panel (TSP), and the output of the touch sensor is monitored. Typically, the input signal may be in the form of a clock pattern (e.g., a clock signal) with alternating sequence of ones and zeros, or may be in the form of a sinusoid waveform. While less common, ramp waveforms or saw-tooth waveforms may be used as the input signals. The output signal changes (typically it drops in magnitude) in response to a touch event (e.g. a finger or object such as a stylus contacting the TSP).

For a given touch sensor, there is a narrow band of frequencies where the touch sensor exhibits a difference between a touch and no-touch. This band of frequencies is ideal for transmitting the input signal, but there may also be noise sources that occupy the same band of frequencies. These noise sources may be time varying and/or frequency varying, and may lead to false indications of touch events on the TSP.

According to one or more example embodiments of the present disclosure, the input signal may be spread out over a wideband (or sub-bands within the wideband) of frequencies, and touch events may be detected in the output signal on the same frequencies (or instantaneous frequencies) of the input signal. According to one or more embodiments of the present disclosure, one or more state machines may control one or more transmitters to transmit the input signal to the TSP at set or predetermined frequencies spread over a wideband (or sub-bands within the wideband), and the one or more state machines may calibrate one or more receivers to listen to the output signal for touch events on the same set or predetermined frequencies over the wideband (or sub-bands) as that of the input signal, while filtering out noises at other frequencies. For example, the receivers may be connected to output lines of the TSP, and each of the receivers may include one or more filters (e.g., bandpass filters) to filter the output signal on each of the output lines to detect touch events. The state machines may configure each of the filters according to the same or instantaneous frequency of the input signals at any given time. Accordingly, touch events may be detected on the output signals at the same or instantaneous frequency of the input signal, while noises are filtered out at other frequencies.

Accordingly, undesirable noises may be reduced or eliminated, leading to a more reliable TSP. Further, because the input signal is spread out over the wideband of frequencies, electromagnetic emissions may also be reduced.

Figure 2:
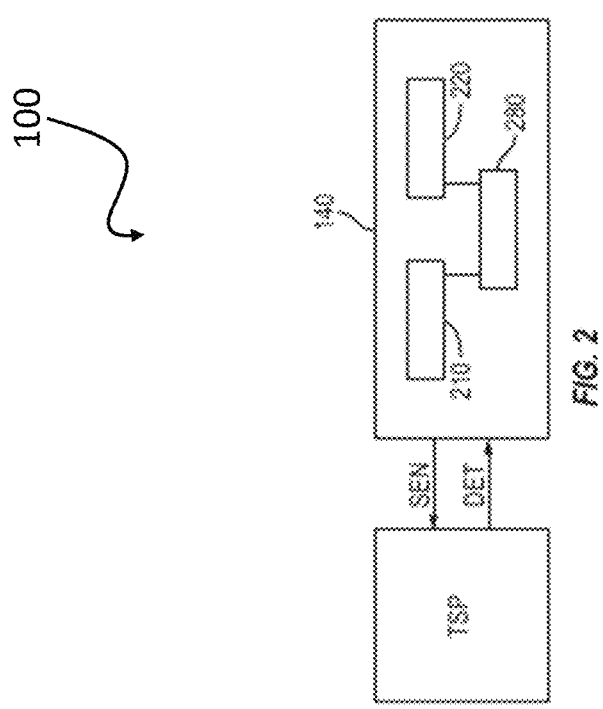
FIG. 2 is a diagram illustrating a transceiver system according to one or more embodiments of the present disclosure.
Figure 3:
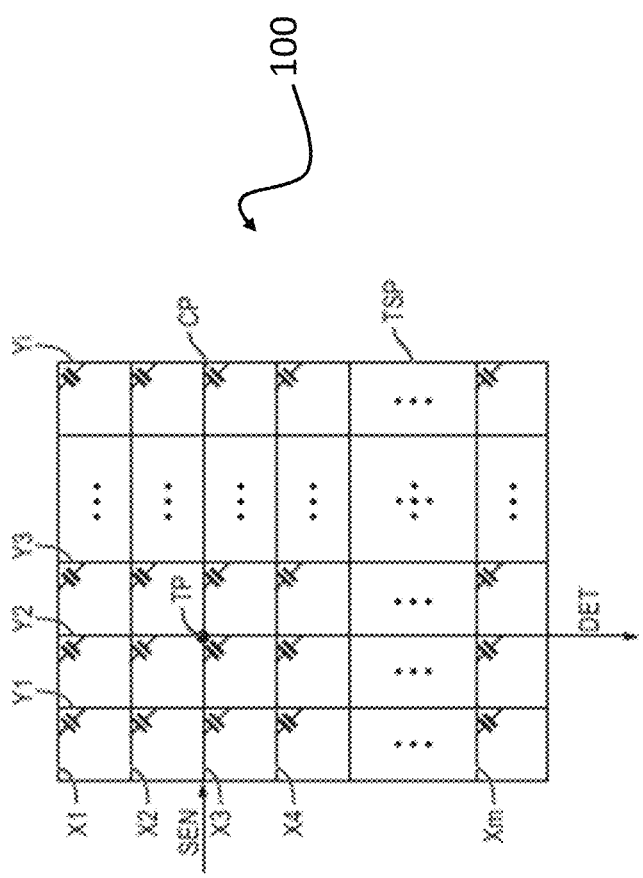
FIG. 3 is a diagram illustrating an example of the touch screen panel shown in FIGS. 1 and 2 according to one or more embodiments of the present disclosure.

FIG. 1 is a diagram illustrating a display device including a touch screen panel according to some embodiments of the present disclosure, FIG. 2 is a diagram illustrating a transceiver system according to some embodiments of the present disclosure, and FIG. 3 is a diagram illustrating an example of the touch screen panel shown in FIGS. 1 and 2 according to some embodiments of the present disclosure.

Referring to FIGS. 1 through 3, a touch sensor system 100 includes a timing controller 110, a scan driver 120, a data driver 130, and a plurality of pixels Px arranged in an active area (e.g., a display area or a touch area) AA. Each of the plurality of pixels Px is coupled to respective ones of scan lines SL1 to SLn, where n is a positive integer, and data lines DL1 to DLj, where j is a positive integer, at crossing regions of the scan lines SL1 to SLn and the data lines DL1 to DLj. Each of the pixels Px receives a data signal from the data driver 130 through the respective one of the data lines DL1 to DLj, when a scan signal is received from the scan driver 120 through a respective one of the scan lines SL1 to SLn.

The timing controller 110 receives an image signal Image, a synchronization signal Sync, and a clock signal CLK from an external source (e.g., external to the timing controller). The timing controller 110 generates image data DATA, a data driver control signal DCS, and a scan driver control signal SCS. The synchronization signal Sync may include a vertical synchronization signal Vsync and a horizontal synchronization signal Hsync. The timing controller 110 transmits the image data DATA and the data driver control signal DCS to the data driver 130, and transmits the scan driver control signal SCS to the scan driver 120.

A touch screen panel TSP may be arranged to overlap with the plurality of pixels Px in the active area AA. The touch screen panel TSP may detect a touch point (e.g., a contact position or a touch event) TP of a user's hand or object at the active area AA, and may convert information of the touch point TP into an electrical signal. The electrical signal may be transmitted to a corresponding receiver connected to a corresponding output line of the touch screen panel TSP as an output signal of the touch screen panel TSP.

In this regard, a touch transceiver (or touch driver) 140 may be connected to the touch screen panel TSP. The touch transceiver 140 may include one or more transmitters 210, one or more receivers 220, and one or more state machines 280 to control and configure the transmitters 210 and the receivers 220. According to one or more example embodiments of the present disclosure, the state machines 280 may control the transmitter 210 to transmit an input signal over wideband frequencies (or sub-bands within the wideband) to the touch screen panel TSP, and may calibrate the receiver 220 to listen to the output signal at the same frequencies of the input signal, while filtering out noise at other frequencies. Accordingly, the state machines 280 may keep the one or more transmitters 210 in sync with the one or more receivers 220, so that touch events may be detected at any given time at a corresponding frequency over the wide band frequencies (or sub-bands).

The touch screen panel TSP may include a plurality of touch sensors. In some embodiments, the plurality of touch sensors may include, for example, a plurality of first lines (e.g., first electrodes or input lines) X1 to Xm, and a plurality of second lines (e.g., second electrodes or output lines) Y1 to Yi crossing the plurality of first lines X1 to Xm, where m and i are natural numbers. For example, the plurality of first lines X1 to Xm may extend in a row direction, and the plurality of second lines Y1 to Yi may extend in a column direction.

A mutual parasitic capacitor Cp may be formed at each crossing region of the first lines X1 to Xm and the second lines Y1 to Yi. Each crossing region at which the mutual parasitic capacitor Cp is formed may operate as a touch sensor (or sensing cell) that may recognize a touch event.

The touch transceiver 140 may supply input signals SEN to the first lines X1 to Xm through control of the timing controller 110. For example, the one or more transmitters 210 may be connected to the first lines X1 to Xm to supply the input signals SEN to the first lines X1 to Xm sequentially or concurrently (e.g., simultaneously or at the same time). In an embodiment in which the input signals SEN are supplied to the first lines X1 to Xm, the mutual capacitance generated in each touch sensor generates an output signal (e.g., a sensing signal) DET on corresponding second lines Y1 to Yi. Thus, in the event that a user's finger or object comes in contact with the touch screen panel TSP, for example, at the touchpoint TP in FIG. 2, a change in mutual capacitance occurs at the touchpoint TP. Accordingly, the output signal DET on a corresponding one of the second lines Y1 to Yi (e.g., at the second output line Y2 in the example shown in FIG. 2) is also changed, thereby registering (or recognizing) a touch. In this regard, the one or more receivers 220 may be connected to the second lines Y1 to Yi to receive and filter the output signals DET from the second lines Y1 to Yi.

Embodiments of the present disclosure may provide a relatively less complex touch sensing system and method, with fewer components for sensing and processing touch events, compared to alternative systems, and may also have a relatively higher signal to noise ratio per unit of power consumption.

Figure 4:
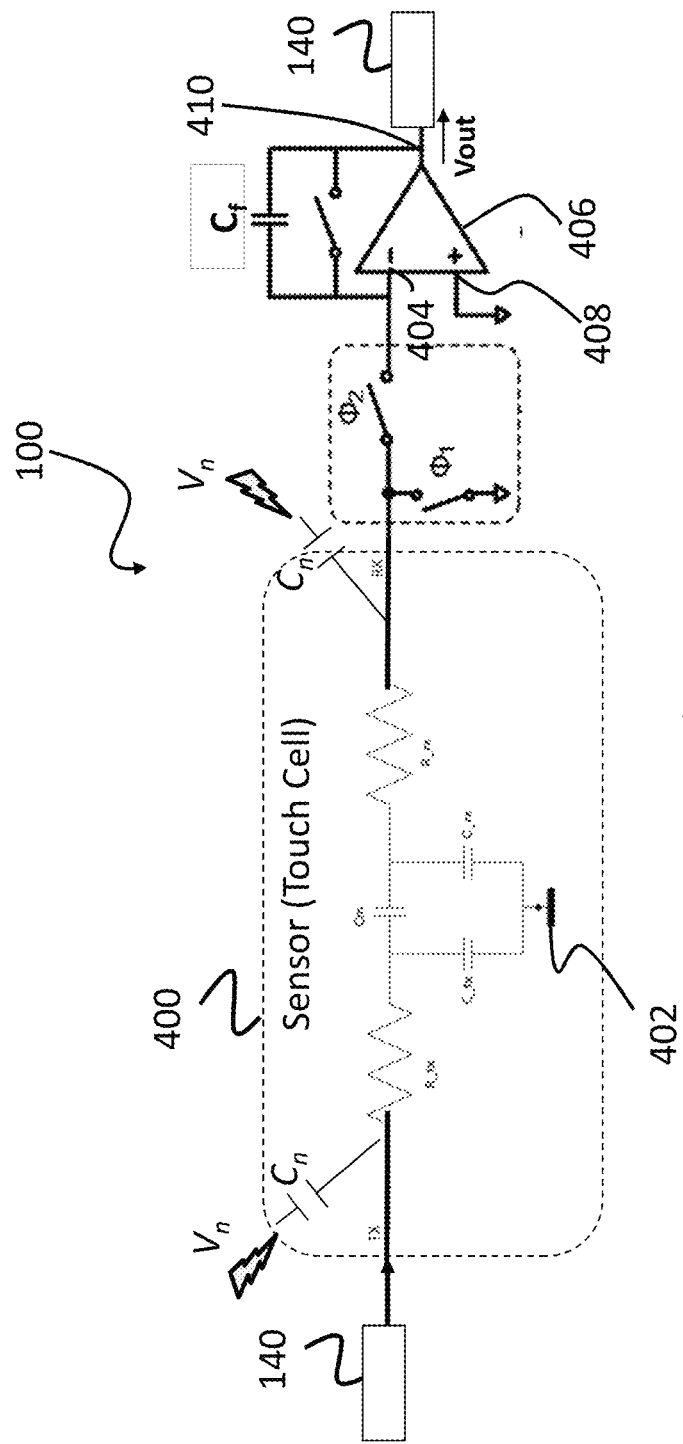
FIG. 4 is a diagram illustrating a touch cell according to some example embodiments of the present disclosure.

FIG. 4 is a diagram illustrating a touch cell according to some example embodiments of the present disclosure. As shown in FIG. 4, a touch cell or sensor 400 includes a transmission node or input line TX (e.g., from among the input lines X1-Xm) and a receiver node or output line RX (e.g., from among the output lines Y1-Yi). Throughout the present disclosure and the claims, the terms "transmission node" and "input line" may be used synonymously. Similarly, throughout the present disclosure and the claims the terms "receiver node" and "output line" may be use synonymously.

A touch event may be detected based on changes in a mutual capacitance, $C_m$, between the transmission node TX and the receiver node RX. As illustrated in FIG. 4, the input line and output line may include some inherent resistance R_tx and R_rx, respectively. Similarly, parasitic capacitances C_tx and C_rx may exist between the transmission node TX and a reference node 402, and between the receiver node RX and the reference node 402.

The voltage at the receiver node RX may be applied to a first input terminal (e.g., a negative input terminal) 404 of an operational amplifier 406, by way of control switches $\Phi_1$ and $\Phi_2$. A second input terminal 408 of the operational amplifier 406 may be connected to a low voltage (e.g., ground). A feedback capacitor $C_f$ may be coupled in parallel to the operational amplifier 406, which may force the charge to accumulate onto Cf, as opposed to C_tx and C_rx. In some instances, a switch 412 may be coupled between the electrodes of the feedback capacitor $C_f$ to control whether or not a charge is stored in the feedback capacitor $C_f$. The output voltage $V_{out}$ at an output terminal 410 of the operational amplifier 406 may be applied to the driver 140 to detect whether or not a touch input has occurred based on changes in the output voltage $V_{out}$ (and the mutual capacitance $C_m$).

In order to detect a touch input, the unknown mutual capacitance $C_m$ between the transmission node TX and the receiver node RX may be charged to a known voltage (e.g., by the transceiver or driver 140). Then, the charge stored as the mutual capacitance $C_m$ may be transferred and integrated onto a sampling capacitor $C_s$ to hold the value of the output signal (e.g., at the output electrode 410) and/or transferred to the touch receiver 140.

The operations of charging the unknown mutual capacitance $C_m$ to a known voltage, and transferring and integrating the charge $C_m$ to the sampling capacitor $C_s$ may be repeated or cycled several times. In some instances, once the voltage on the sampling capacitor $C_s$ reaches a reference voltage, the touch sensor system 100 may stop and measure the time and/or number of cycles to reach the reference voltage in order to determine whether or not a touch event has occurred. In other instances, the voltage on the sampling capacitor $C_s$ may be digitized after a set or predetermined number of cycles to determine whether or not a touch event has occurred.

The power utilized for driving the transmission node TX in embodiments according to FIG. 4 may be calculated according to equation (1), below:

$$\text{Power} = V_{dd} \cdot C_{tx} \cdot V_{pp} \cdot f = V_{dd} \cdot C_{tx} \cdot V_{out} \cdot \frac{C_f}{C_m} \cdot f \qquad (1)$$

where $V_{dd}$ is the voltage applied to transmission node TX, $C_{tx}$ is the capacitance between the transmission node TX and a reference node 402, $V_{pp}$ is the maximum variation of the driver voltage (e.g., if the transmission voltage swings between −1V to 1V, $V_{pp}$ is 2V), f is the frequency of the transmission input signal, Vout is the output voltage (e.g., output from an operational amplifier 406 that receives the voltage from the receiver node RX as an input) applied to the transceiver or driver 140, and Cf is the capacitance of the feedback transistor $C_f$.

Figure 5:
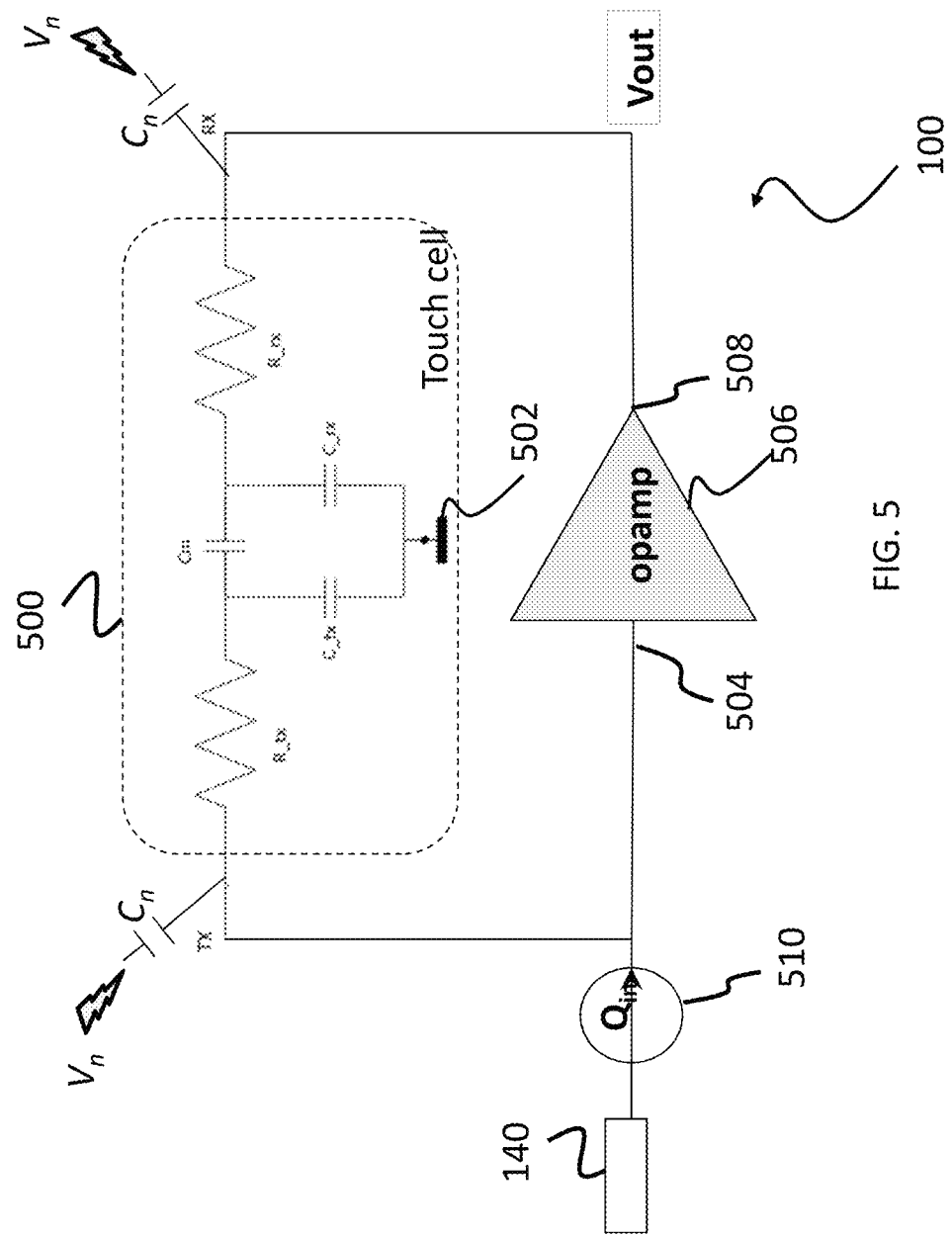
FIG. 5 is a diagram illustrating another touch cell according to some example embodiments of the present disclosure.

FIG. 5 is a diagram illustrating another touch cell according to some example embodiments of the present disclosure. As shown in FIG. 5, according to some example embodiments of the present disclosure, a touch cell or sensor 500 includes a transmission node or input line TX (e.g., from among the input lines X1-Xm) and a receiver node or output line RX (e.g., from among the output lines Y1-Yi).

As in the embodiment illustrated in FIG. 4, a touch event may be detected based on changes in a mutual capacitance, $C_m$, between the transmission node TX and the receiver node RX. Like the embodiment illustrated in FIG. 4, the input line and output line may include some inherent resistance R_tx and R_rx, respectively. Similarly, parasitic capacitances C_tx and C_rx may exist between the transmission node TX and a reference node 502, and between the receiver node RX and the reference node 502.

In contrast to the embodiment illustrated in FIG. 4, rather than amplifying the output voltage at the receiver node RX by applying the voltage to an input terminal of an operational amplifier, some example embodiments of the present disclosure may directly amplify the mutual capacitance, by connecting an input terminal 504 of an operational amplifier 506 to the transmission node TX, and connecting an output terminal 508 of the operational amplifier 506 to the receiver node RX.

A known amount of charge $Q_{in}$ is applied to the transmission node Tx (e.g., by way of a current or voltage source 510 controlled, for example, by the driver 140). The voltage $V_{out}$ at the output terminal 508 of the operational amplifier 506 and/or the receiver node RX may be measured to detect touch events based on changes in the voltage $V_{out}$. The voltage $V_{out}$ may be proportional to a ratio of the known charge $Q_{in}$ divided by the mutual capacitance $C_m$. That is, the voltage $V_{out}$ (and/or the voltage $V_{RX}$ at the receiver node RX) is proportional (or equal) to $Q_{in}/C_m$.

According to some example embodiments of the present disclosure, by directly amplifying the mutual capacitance $C_m$, as illustrated in FIG. 5, a large voltage may be achieved at $V_{out}$ and/or $V_{RX}$. Additionally, embodiments of the present disclosure may provide relatively lower sensitivity to noise at the receiver node RX and capacitance $C_{RX}$. According to some example embodiments, the same operational amplifier 506 may be connected to and utilized for multiple input lines and output lines but, according to some embodiments, each transmission node TX and receiver node RX combination that is read at the same time may utilize a different operational amplifier 506.

Additionally, in contrast to the embodiment illustrated in FIG. 4, the power for driving the transmission node TX according to the embodiment illustrated in FIG. 5 may be calculated according to the following equation (2), below:

$$\text{Power} = V_{dd} \cdot Q_{in} \cdot f = V_{dd} \cdot V_{out} \cdot C_m \cdot f \qquad (2)$$

Thus, the ratio of transmission powers for the same output voltage and frequency is shown in equation (3), below:

$$\frac{\text{Embodiment of FIG. 4 Transmission Power}}{\text{Embodiment of FIG. 5 Transmission Power}} = \qquad (3)$$

$$\frac{V_{dd} \cdot C_{tx} \cdot V_{out} \cdot \frac{C_f}{C_m} \cdot f}{V_{dd} \cdot V_{out} \cdot C_m \cdot f} = \frac{C_{tx} \cdot C_f}{C_m^2}$$

In some embodiments, the above ratio in equation (3) may be on the order of $10^3$.

Additionally, the embodiment illustrated in FIG. 5 may have relatively less sensitivity to noise (e.g., noise coupled to the transmission node TX, the receiver node RX, amplifier noise, thermal noise, etc.) compared to alternative systems, for example, the embodiment illustrated in FIG. 4. For example, in the embodiments illustrated in both FIG. 4 and FIG. 5, noise sources such as display noise (e.g., voltage $V_n$) may be coupled through parasitic capacitance $C_n$ to the transmission node TX and the receiver node RX.

In the embodiment illustrated in FIG. 4, the noise at the output electrode 410 may be calculated according to equation (4), below:

$$V_{outn} = V_n \cdot \frac{C_n \cdot C_m}{C_{tx} \cdot C_f} \qquad (4)$$

By contrast, in the embodiment illustrated in FIG. 5, the noise at the output electrode 508 may be calculated according to equation (5), below:

$$V_{outn} = V_n \cdot \frac{C_n}{C_m} \qquad (5)$$

In the case of an input-referred voltage noise and an input-referred current noise for the operational amplifier, the transfer functions for each noise source to the output of the operational amplifier in the embodiments shown in FIGS. 4 and 5 are shown below in Table 1.

TABLE 1

| Noise Source | Embodiment of FIG. 4 | Embodiment of FIG. 5 |
|---|---|---|
| Input-referred voltage source | $\dfrac{C_{rx}}{C_f}$ | $\dfrac{C_{tx}}{C_m}$ |
| Input-referred current source | $\dfrac{1}{sC_f}$ | $\dfrac{1}{sC_m}$ |

Additionally, sensor resistors (e.g., $R_{TX}$ and $R_{RX}$) may contribute nose to the system output. The transfer functions for each noise source to the output of the amplifier in the embodiments of FIGS. 4 and 5 are illustrated below in Table 2.

TABLE 2

| Noise Source | Embodiment of FIG. 4 | Embodiment of FIG. 5 |
|---|---|---|
| $R_{TX}$ | $\dfrac{C_m}{C_f}$ | $\dfrac{1}{sC_m R_{TX}}$ |
| $R_{RX}$ | $\dfrac{1}{sC_f R_{RX}}$ | 1 |

TABLE 2-continued

| Noise Source | Embodiment of FIG. 4 | Embodiment of FIG. 5 |
| --- | --- | --- |

Table 3, below, shows the signal-to-noise ratio (SNR) for the signal to each noise source separately (assuming the same amount of power is consumed in the transmission node TX for both systems).

TABLE 3

| Noise Source | Embodiment of FIG. 4 | Embodiment of FIG. 5 |
| --- | --- | --- |
| Tx Coupling | $\dfrac{Power}{V_{dd} \cdot f \cdot v_n \cdot C_n}$ | $\dfrac{Power}{V_{dd} \cdot f \cdot v_n \cdot C_n}$ |
| Rx Coupling | $\dfrac{Power}{V_{dd} \cdot f \cdot v_n \cdot C_n} \cdot \dfrac{C_m}{C_{tx}}$ | $\dfrac{Power}{V_{dd} \cdot f \cdot v_n \cdot C_n} \cdot \dfrac{C_{rx}}{C_n}$ |
| Opamp Input-referred voltage source | $\dfrac{Power}{V_{dd} \cdot f \cdot v_n \cdot C_{tx}} \cdot \dfrac{C_m}{C_{rx}}$ | $\dfrac{Power}{V_{dd} \cdot f \cdot v_n \cdot C_{tx}}$ |
| Opamp Input-referred current source | $\dfrac{sPower}{V_{dd} \cdot f \cdot i_n} \cdot \dfrac{C_m}{C_{tx}}$ | $\dfrac{sPower}{V_{dd} \cdot f \cdot i_n}$ |
| $R_{tx}$ | $\dfrac{Power}{V_{dd} \cdot f \cdot v_n} \cdot \dfrac{1}{C_{tx}}$ | $\dfrac{Power}{V_{dd} \cdot f \cdot v_n} \cdot sR_{tx}$ |
| $R_{rx}$ | $\dfrac{Power}{V_{dd} \cdot f \cdot v_n} \cdot \dfrac{sC_m \cdot R_{rx}}{C_{tx}}$ | $\dfrac{Power}{V_{dd} \cdot f \cdot v_n}$ |

The embodiment of FIG. 5 may have a higher SNR for the transmission node TX coupling, $R_{TX}$ thermal noise, and $R_{RX}$ thermal noise. The embodiment of FIG. 4, by contrast may have a higher SNR for operational amplifier noise sources. In many instances, the transmission node TX and receiver node RX coupling that comes from display noise is the dominant source of noise, thus the embodiment illustrated in FIG. 5 may have a larger overall SNR.

Table 4, below, shows simulation results comparing the SNR of the embodiments illustrated in FIGS. 4 and 5, in which the transmission node TX receives the same amount of power. As shown in table 4, the embodiment illustrated in FIG. 5 may have a relatively higher SNR (e.g., 25 dB higher) compared to the embodiment illustrated in FIG. 4.

TABLE 4

|  | Signal | Noise(rms) | SNR |
| --- | --- | --- | --- |
| Proposed | 230 mV | 560 mV | −8 dB |
| Conventional | 32 uV | 1.5 mV | −33 dB |

Figure 6:
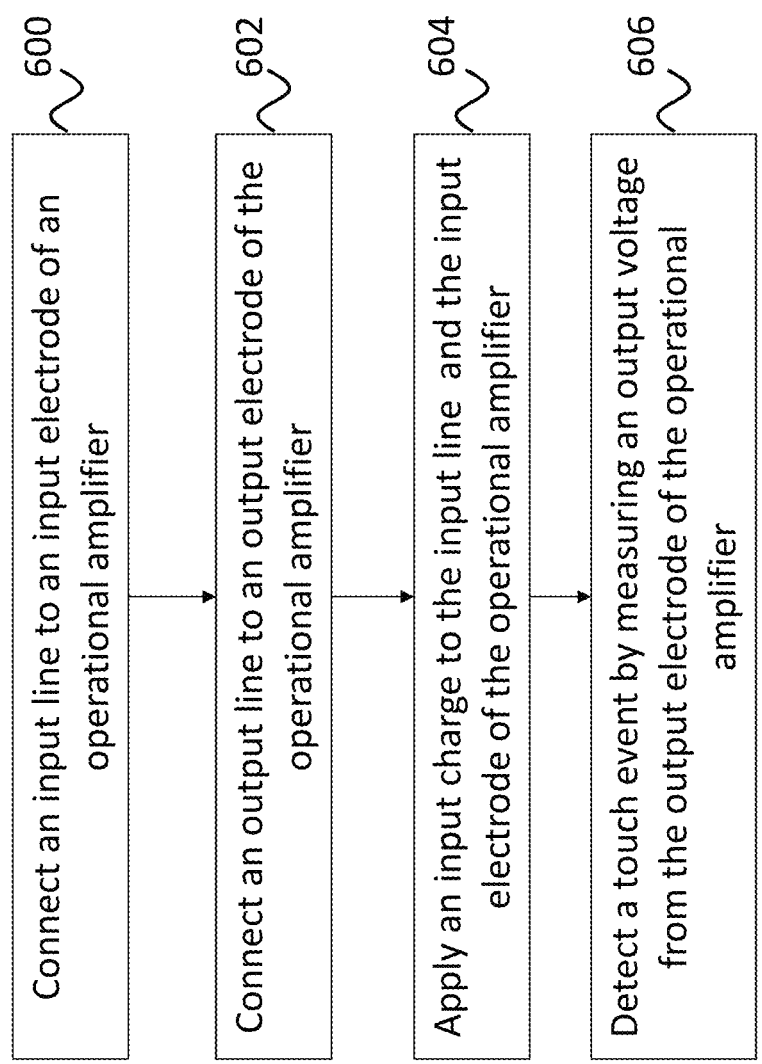
FIG. 6 is a flow diagram of a method of driving a touch screen panel according to some example embodiments of the present disclosure.

FIG. 6 is a flow diagram of a method of driving a touch screen panel according to some example embodiments of the present disclosure. However, the present disclosure is not limited to the sequence or number of operations of the method shown in FIG. 6, and various embodiments of the present disclosure may include additional or fewer operations, and the sequence of operations may vary.

Referring to FIG. 6, the method starts and, at 600, an input line or transmission node of a touch screen panel is connected to an input electrode of an operational amplifier. At 602, an output line or receiver node of the touch screen panel is connected to an output electrode of the operational amplifier. Then, at 604, a known input charge is applied to input line or transmission node and the input electrode of the operational amplifier. At 606, a touch event may be detected by measuring an output voltage from the output electrode of the operational amplifier (e.g., based on changes in the output voltage and/or the mutual capacitance between the transmission node and the receiver node).

Thus, one or more embodiments of the present disclosure, may be configured to drive a touch screen panel by directly amplifying the mutual capacitance between an input line and an output line using miller amplification. The transmission node or input line of a touch cell is connected to the input electrode of an operational amplifier, and the receiver node or output line of the touch cell is connected to the output electrode of the operational amplifier. A known amount of charge is applied to the transmission node or input line of the touch cell, and the voltage, $V_{RX}$, at the receiver node or output line is proportional to the charge, $Q_{in}$, applied to the transmission node or input line of the touch cell, divided by the mutual capacitance, $C_m$, between the transmission node or input line and the receiver node or output line. That is, $V_{RX}$ is proportional (or equal) to $Q_{in}/C_m$.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Although the present disclosure has been described with reference to the example embodiments, those skilled in the art will recognize that various changes and modifications to the described embodiments may be performed, all without departing from the spirit and scope of the present disclosure. Furthermore, those skilled in the various arts will recognize that the present disclosure described herein will suggest solutions to other tasks and adaptations for other applications. It is the applicant's intention to cover by the claims herein, all such uses of the present disclosure, and those changes and modifications which could be made to the example embodiments of the present disclosure herein chosen for the purpose of disclosure, all without departing from the spirit and scope of the present disclosure. Thus, the example embodiments of the present disclosure should be considered in all respects as illustrative and not restrictive, with the spirit and scope of the present disclosure being indicated by the appended claims, and their equivalents.

What is claimed is:

1. A display device comprising:
    a display panel configured to display an image at an active area;
    a touch screen panel overlapping the display panel at the active area, the touch screen panel comprising an input line and an output line; and
    an operational amplifier having an input electrode coupled to the input line and an output electrode coupled to the output line, wherein the display device is configured to measure a voltage at the output electrode of the operational amplifier for detecting a touch event at an intersection between the input line and the output line, wherein the touch event is detected based on a change in a mutual capacitance between the input line and the output line, wherein the display device is further comprising a current source coupled to the input line and the input electrode of the operational amplifier, wherein the current source is configured to apply a predetermined charge to the input line and the input electrode of the operational amplifier.

2. The display device of claim 1, wherein the mutual capacitance between the input line and the output line is directly amplified using miller amplification.

3. The display device of claim 1, wherein the voltage at the output electrode of the operational amplifier is proportional to a ratio of a predetermined input charge divided by the mutual capacitance between the input line and the output line.

4. The display device of claim 3, wherein the display device is configured to detect the touch event in response to a change in the voltage at the output electrode of the operational amplifier.

5. A system comprising:
    a touch screen panel comprising an input line and an output line;
    an operational amplifier having an input electrode coupled to the input line and an output electrode coupled to the output line; and
    a current source coupled to the input line and the input electrode of the operational amplifier for applying a predetermined charge to the input line and the input electrode of the operational amplifier, wherein the touch screen panel is configured to measure a voltage at the output electrode of the operational amplifier for detected a touch event at an intersection between the input line and the output line, wherein the touch event is detected based on a change in mutual capacitance between the input line and the output line.

6. The system of claim 5, wherein a mutual capacitance between the input line and the output line is directly amplified using miller amplification.

7. The system of claim 5, further comprising a display panel configured to display an image at an active area.

8. The system of claim 7, wherein the touch screen panel overlaps the display panel at the active area.

9. The system of claim 5, wherein the voltage at the output electrode of the operational amplifier is proportional to a ratio of a predetermined input charge divided by the mutual capacitance between the input line and the output line.

10. The system of claim 9, wherein the system is configured to detect the touch event in response to a change in the voltage at the output electrode of the operational amplifier.

11. A method of driving a touch screen panel, the method comprising:
   applying an input charge to an input line and an input electrode of an operational amplifier;
   measuring an output voltage from an output electrode of the operational amplifier; and
   detecting a touch event based on a change in the output voltage from the output electrode of the operational amplifier, wherein the input line is connected to the input electrode of the operational amplifier and an output line is connected to the output electrode of the operational amplifier, wherein the change in the output voltage is based on a change in a mutual capacitance between the input line and the output line, wherein the method further comprising applying the input charge by a current source coupled to the input line and the input electrode of the operational amplifier.

12. The method of claim 11, wherein the mutual capacitance between the input line and the output line is directly amplified using miller amplification.

13. The method of claim 11, wherein the touch screen panel comprises the input line and the output line, overlaps a display panel at an active area configured to display an image.

14. The method of claim 11, wherein the output voltage at the output electrode of the operational amplifier is proportional to a ratio of the input charge divided by a mutual capacitance between the input line and the output line.

* * * * *